United States Patent [19]
Moore

[11] 3,889,644
[45] June 17, 1975

[54] ENGINE COOLING SYSTEM

[75] Inventor: Trevor J. Moore, Bourne, England

[73] Assignee: Perkins Engines Limited, London, England

[22] Filed: Apr. 10, 1974

[21] Appl. No.: 459,843

[30] Foreign Application Priority Data
Apr. 12, 1973 United Kingdom............ 17742/73

[52] U.S. Cl. ........ 123/41.77; 123/41.32; 123/41.85
[51] Int. Cl. .............................................. F01p 3/14
[58] Field of Search........... 123/41.77, 41.85, 41.76, 123/41.75, 41.32

[56] References Cited
UNITED STATES PATENTS

| | | | |
|---|---|---|---|
| 2,691,366 | 10/1954 | Flatz | 123/41.77 |
| 3,074,389 | 1/1963 | Lilly | 123/41.77 |
| 3,089,471 | 5/1963 | Espenschied | 123/41.85 |
| 3,353,522 | 11/1967 | Ley | 123/41.85 |
| 3,420,215 | 1/1969 | Seifert | 123/41.77 |
| 3,491,731 | 1/1970 | Dinger | 123/41.77 |
| 3,547,086 | 12/1970 | Skatsche | 123/41.85 |
| 3,769,948 | 11/1973 | Feichtinger | 123/41.85 |

Primary Examiner—Manuel A. Antonakas
Assistant Examiner—Daniel J. O'Connor
Attorney, Agent, or Firm—Thomas P. Lewandowski

[57] ABSTRACT

A liquid cooled engine has a cylinder head having two coolant chambers, one in the form of a gallery, and at least one air and one exhaust passage cast therein, wherein a coolant passage from the gallery to the other chamber passes between the air and exhaust passage and the flow of coolant therein acts to cool the metal of the cylinder head located between the inlet and exhaust valve seats. Also in the case of an engine having a combustion chamber in the head the passage is so aligned as to direct a stream of coolant at the outer surface of the combustion chamber. Alternatively, if the engine is a fuel injection engine and does not have a combustion chamber in the head, the passage may be aligned so as to direct the coolant stream in the direction of the injectors.

5 Claims, 6 Drawing Figures

ENGINE COOLING SYSTEM

It is a shortcoming on high speed diesel engines that the area of the cylinder head known as the "valve bridge", that is that portion of metal constituting a separating partition between the poppet valve seats, is susceptible to cracking. Other areas of the cyllinder head in which cracking may occur are usually local to hot zones.

It is an aim of the present invention to obviate or mitigate the above disadvantages.

It is an object of the present invention to provide a liquid cooled internal combustion engine incorporating a cylinder head, at least one air passage terminating at an inlet valve seat, at least one exhaust gas passage terminating at an exhaust valve seat, first and second coolant chambers cast therein, the first of the chambers being in the form of a gallery, wherein a coolant passage joining the two chambers is arranged to pass between at least a part of each of the air and the exhaust gas passages, the arrangement being that flow of coolant therein acts to cool the metal of the cylinder head between the inlet and exhaust valve seats.

It is a further object of the present invention to provide an engine wherein a combustion chamber is placed in the head, the coolant passage is so aligned as to direct a stream of coolant at an outer surface of the combustion chamber and additionally when the combustion chamber has an exit channel to enable exhaust gases to flow into a corresponding cylinder, and the coolant passage is so aligned as to direct coolant closely above the metal defining said exit channel.

Yet a further object of the present invention is to provide an engine including a cylinder block defining third and fourth coolant chambers the third chamber being positioned beneath the gallery, a plurality of paired gallery feed ports in the head and block respectively in register with each other to permit coolant to pass from the third chamber to the gallery and optionally and additionally wherein said fourth chamber is arranged as a longitudinally extending duct on the side of the engine opposite to the gallery and a plurality of paired duct outlet ports in the head and duct respectively which are in register with each other and permit coolant to pass from the duct to the second chamber throughout the length of the latter.

The present invention relates to internal combustion engines and more particularly, though not exclusively to diesel engines having internal cooling.

The cooling system is incorporated in the cylinder head of the engine which includes at least one exhaust gas passage terminating at an exhaust valve seat and including a wall of metal having an aperture therethrough while at the same time partitioning the inlet and exhaust passages where the passages terminate at the valve seats. First and second coolant chambers internal to the cylinder head are joined by the aperture within the wall to cool the wall by passage of coolant from the first chamber to the second chamber through the aperture in the wall. The first chamber may be in the form of a gallery extending over the length of the cylinder head. Where the bottom surface of the wall is considered a bridge between the inlet and exhaust passage valve seats the aperture forms a coolant passage joining the two chambers which passage is arranged to pass between at least a part of each of the air and exhaust gas passages.

The invention will now be described with reference to the accompanying drawings of which:

Figure 1:
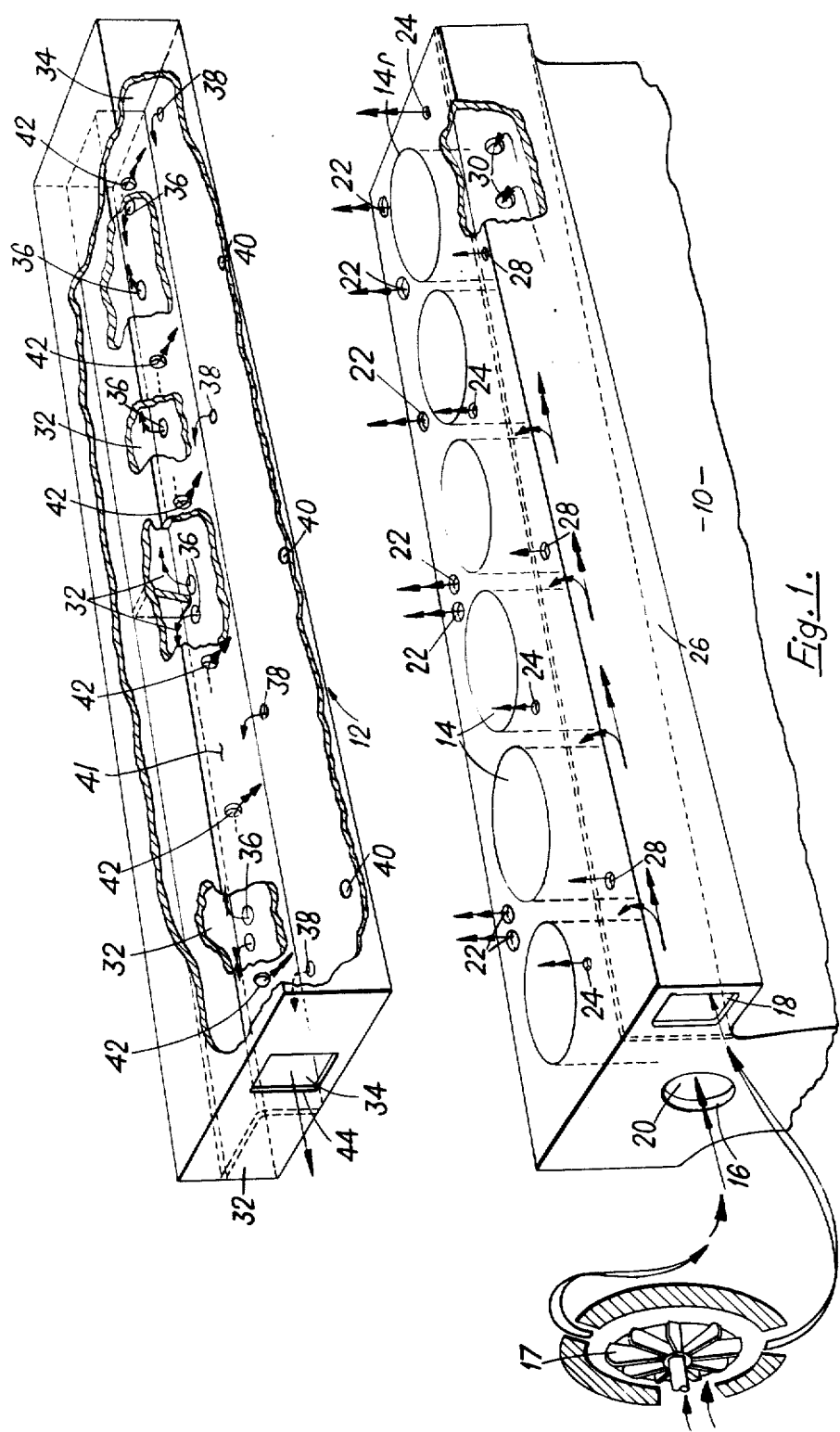
FIG. 1 is a diagramatic drawing of a cylinder block and head incorporating an embodiment of the present system and illustrating the flow paths of coolant.

Two major components namely the cylinder block 10 and cylinder head 12 are shown in FIG. 1. The block 10 consists of a casting and cylinders 14 are formed in it. Liquid coolant passes into the block through openings 16 and 18. A pump 17 with split delivery is used to circulate coolant so that, for example, two thirds of the flow passes into opening 16 and one third into opening 18. The flow through opening 16 indicated by double headed arrows passes into a chamber 20 known as the third chamber and circulates around the cylinders 14 and passes up through the holes 22 and 24.

Coolant entering opening 18 is identified by single headed arrows and flows along a duct 26 close alongside the tops of the cylinders 14. The duct 26 tapers inwardly along its length so that the coolant flowing into it is evenly distributed and forced out upwardly through holes 28 and the rear cylinder transfer ports 30. The latter connect the duct 26 with the third chamber 20 in the vicinity of the rearmost cylinder 14r and ensures a measure of cooling circulation around it.

The cylinder head 12 is shown displaced above the block 10 for convenience of description, and valve gear, bolts, injectors and similar items mounted on the head have been omitted for the sake of clarity of illustrating the coolant flow. The head 12 is divided into two coolant chambers namely a gallery 32 and a second chamber 34. The holes 36 in the floor of the gallery 32 are in register with the holes 22 in the block 10 when the head 12 and block 10 are assembled. The paired holes 22 and 36 constitute the gallery 32 feed ports. Likewise holes 38 in the floor chamber 34 are in register with holes 24 in the block 10 to form the second chamber coolant inlet ports. Further, the holes 28 are in register with holes 40 and together they form outlet ports for the duct 26.

The sole entry of coolant to gallery 32 is through the gallery feed ports, holes 22 and 36. One passage 42 per cylinder is formed in the side wall 41 of the gallery 32 and enables coolant to flow out of the gallery 32 into the second chamber 34. The passages 42 are specially formed and positioned as will be described in detail later but in general they are located close to the valve "bridge" i.e. that portion of the cylinder head 12 that divides the inlet and outlet valve seats from each other. The jet of coolant issuing from the coolant passage 42 is preferably directed at a combustion chamber or injector as also will be seen later.

All coolant flow from the coolant passages 42, coolant inlet ports, holes 24 and 38 and duct outlet ports, holes 28 and 40 mix and merge in chamber 34 and flow out of the cylinder head 12 through opening 44 to a conventional coolant radiator (not illustrated).

Figure 2:
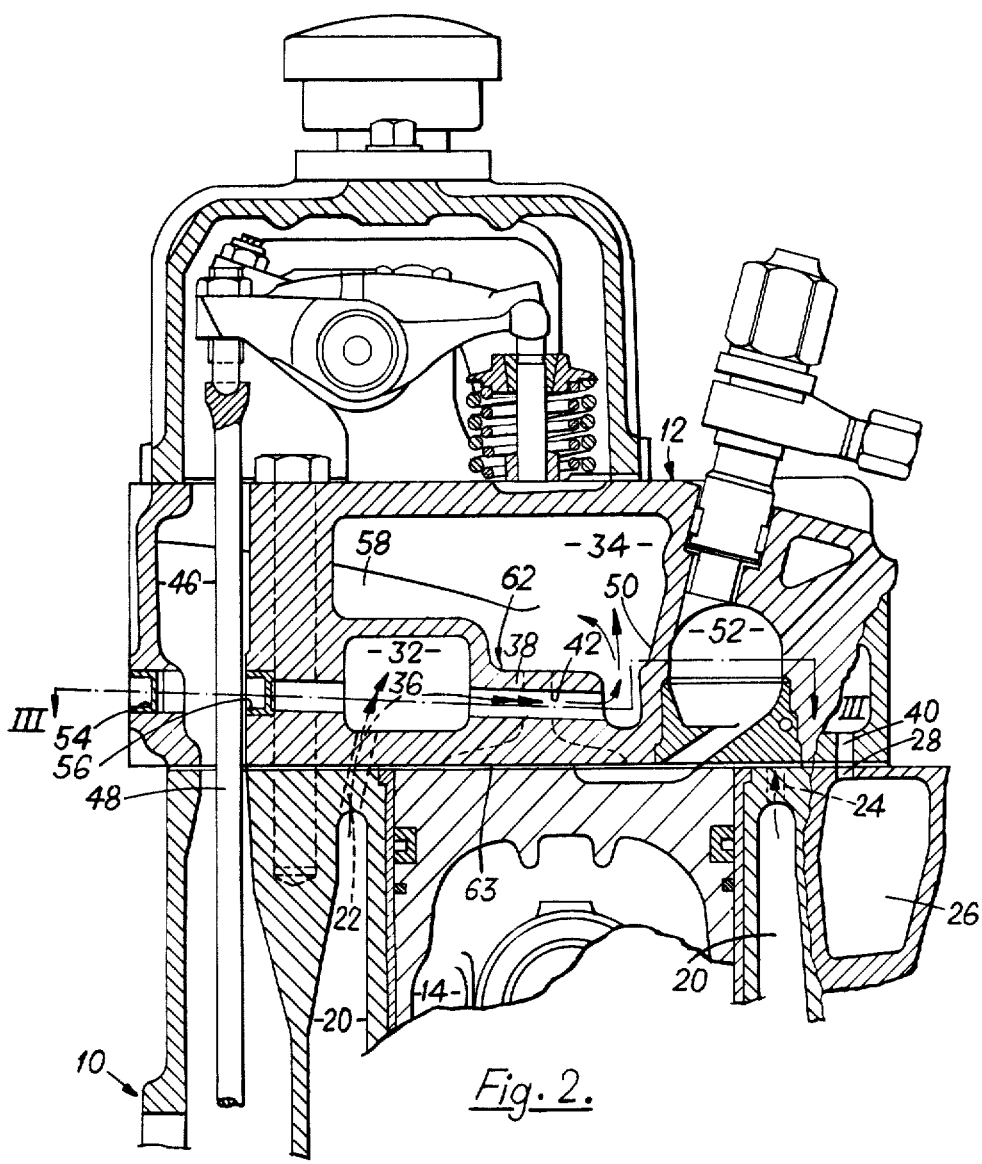
FIG. 2 is a cross-sectional view through an engine with a portion cut away and incorporating one embodiment of the present invention in an engine having an indirect combustion chamber.
Figure 3:
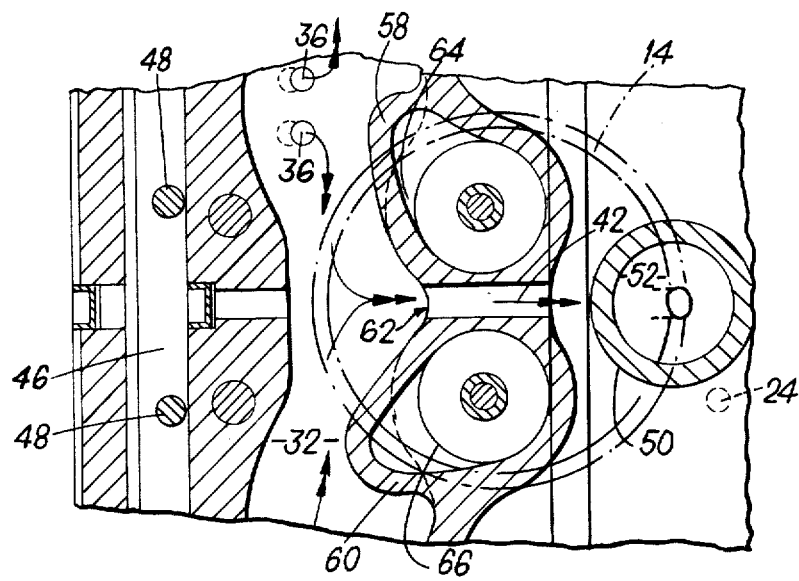
FIG. 3 is a fragmentary cross-sectional view of the cylinder head taken along line III—III in FIG. 2.

FIG. 2 illustrates an embodiment of the invention in an actual engine. Corresponding numerals to those of FIG. 1 identify corresponding parts in FIG. 2. Particularly, it will be seen that flow enters gallery 32 through gallery feed ports, holes 22 and 36 from chamber 20. The coolant passage 42 is formed by drilling from the outside of the head 12, in the present case, through the space 46 for the pushrods 48 and clear through the gallery 32 to emerge in chamber 34 short of the outer wall 50 of the combustion chamber 52 which is of the antechamber type. The drilling is plugged by plugs 54 and 56. FIG. 3 shows the general contour of the gallery 32 as it passes below the inlet air and exhaust gas passages 58 and 60. The outlet port, holes 28 and 40 of duct 26 is displaced longitudinally from the combustion chamber and is illustrated in the broken away portion of FIG. 2.

The passage 42, in FIGS. 2 and 3, is an aperture through a wall 62 between the valve seats 64 and 66. If the bottom surface 63 of the wall 62 is considered a "valve bridge" bridging the gap between the valve seats 64 and 66, it can be appreciated that the passage 42 passes closely over the bridge or, to put it another way, brings the coolant closer to the bottom surface 63 between the valve seats 64 and 66. Further the passage 42 is aligned so that coolant issuing from it impinges on the wall 50 of the combustion chamber 52. Coolant for the opposite side of the combustion chamber 52 is supplied by the outlet ports, holes 28 and 40, of the duct 26. If it is further appreciated that wall 62 is a portion of wall 41 of FIG. 1, then from FIG. 1 it can be seen that all of the flow to gallery 32 must pass through passages 42 which, in turn, in FIG. 2 are directed at the combustion chamber 52.

Figure 4:
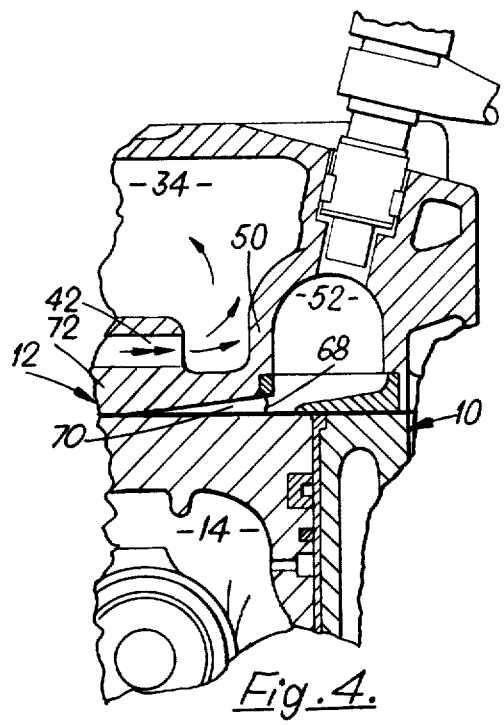
FIG. 4 is a fragmentary cross-sectional view of apparatus similar to FIG. 2 illustrating an alternative form of indirect combustion chamber.

In FIG. 4 there is shown another type of antechamber. In this case the hot gases discharged through the outlet 68 are guided by a groove 70 formed in the wall 72 of the cylinder head. The area of the cylinder head surrounding groove 70 is subjected to intense local heating and it is beneficial for the jet of coolant emerging from passage 42 to flow as closely above the groove 70 as possible to provide cooling for the surrounding area.

Figure 5:
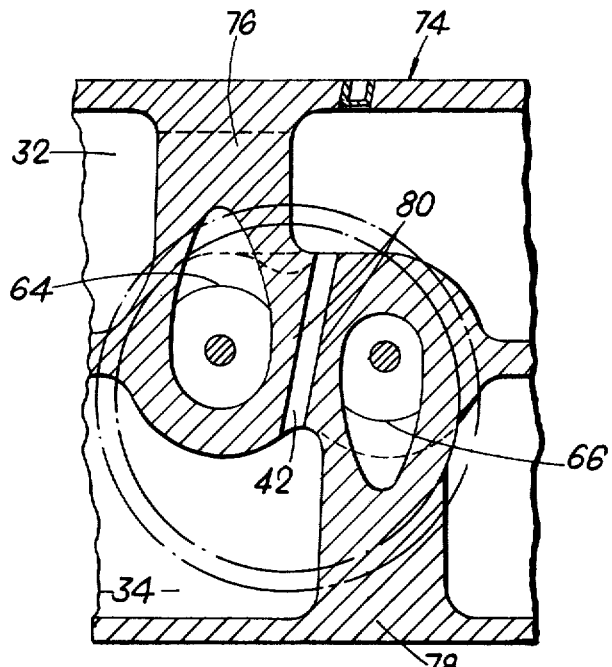
FIG. 5 is a view similar to FIG. 3 illustrating a different type of cylinder head incorporating an embodiment of the present system.

FIG. 5 shows how the invention can be applied to a so-called "cross flow" cylinder head 74 in which the air is aspirated from one side of the head through an inlet port 76 and the exhaust gases are discharged from the other side through an exhaust port 78. As can be seen it is not always necessary for the jet issuing from coolant passage 42 in the wall 80 to impinge on any hot part.

Figure 6:
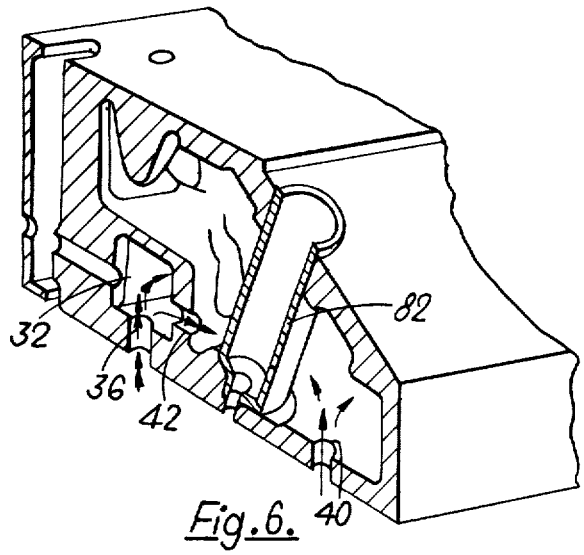
FIG. 6 is a fragmentary cross-sectional perspective view of a cylinder head suitable for a direct injection engine incorporating an embodiment of the present system.

FIG. 6 shows a cutaway perspective drawing of a direct injection engine. In this case the copper injector sleeve 82 which holds the injector in position is cooled by the coolant emerging from coolant passage 42. The injector itself is omitted for the sake of clarity.

The invention mitigates against cracking of the metal constituting the valve bridge in internal combustion engines, and provides for positive direction of all flow from the gallery to the second coolant chamber to assure the flow passes a desired point to be cooled such as the combustion chamber.

I claim:

1. A liquid cooled internal combustion engine incorporating a cylinder head and block, at least one air passage terminating at an inlet valve seat, at least one exhaust gas passage terminating at an exhaust valve seat, first and second coolant chambers cast in the head, the first of the chambers being in the form of a gallery extending over the length of the cylinder head, said two chambers having a coolant passage joining them arranged to pass between at least a part of each of the air and the exhaust gas passages, the arrangement being that flow of coolant in the passage acts to cool the metal of the cylinder head between the inlet and exhaust valve, third and fourth coolant chambers cast in the block, said third chamber being positioned beneath said gallery, and a plurality of paired gallery feed ports in the head and block respectively in register with each other to permit coolant to pass from the third chamber to the gallery.

2. An engine as defined in claim 1 wherein the gallery feed ports constitute the only exit for coolant in the third chamber.

3. An engine as defined in claim 1 wherein said fourth chamber is arranged as a longitudinally extending duct on the side of the engine oppoosite to the gallery and a plurality of paired duct outlet ports in the head and duct respectively which are in register with each other and permit coolant to pass from the duct to the second chamber throughout the length of the latter.

4. An engine as claimed in claim 3 including driven coolant circulating means so connected to said duct and said third chamber as to provide separate flow of coolant thereto.

5. An engine as claimed in claim 4 wherein said duct tapers inwardly along its length from coolant entry end.

* * * * *